United States Patent [19]

Hijikigawa

[11] 4,405,958
[45] Sep. 20, 1983

[54] MAGNETIC REPRODUCING APPARATUS WITH MAGNETORESISTIVE HEAD

[75] Inventor: Masaya Hijikigawa, Yamatokoriyama, Japan

[73] Assignee: Sharp Kabushiki Kaisha, Osaka, Japan

[21] Appl. No.: 358,633

[22] Filed: Mar. 16, 1982

Related U.S. Application Data

[63] Continuation of Ser. No. 116,890, Jan. 30, 1980, abandoned.

[30] Foreign Application Priority Data

Jul. 19, 1979 [JP] Japan .................. 54-100482[U]

[51] Int. Cl.³ .............................................. G11B 5/12
[52] U.S. Cl. .................................. 360/113; 360/72.2; 360/130.22
[58] Field of Search ............. 360/113, 112, 72.1–72.3, 360/74.7, 84–85, 71, 130.22, 130.23

[56] References Cited

U.S. PATENT DOCUMENTS

| | | | |
|---|---|---|---|
| 2,773,120 | 12/1956 | Masterson | 360/84 |
| 3,423,743 | 1/1969 | Silverman | 360/49 X |
| 3,493,694 | 2/1970 | Hunt | 360/113 |
| 3,969,766 | 7/1976 | Tanaka et al. | 360/85 |
| 4,180,838 | 12/1979 | Fehrenkamp | 360/72.1 X |

FOREIGN PATENT DOCUMENTS 1295611  5/1969  Fed. Rep. of Germany ........ 360/84

Primary Examiner—John H. Wolff
Attorney, Agent, or Firm—Birch, Stewart, Kolasch & Birch

[57] ABSTRACT

A magnetic record-reproduction device is provided for controlling a program selection system of a tape containing a recording member and a base element. The recording member records cue signals indicating positions of programs on the tape to be reproduced. The base element supports the recording member. A magnetoresistive head comes into contact with the base element for detecting and reproducing the cue signals recorded in the recording member.

3 Claims, 10 Drawing Figures

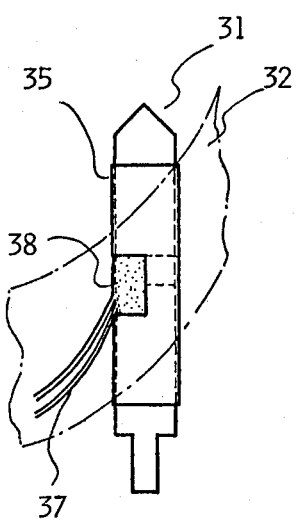
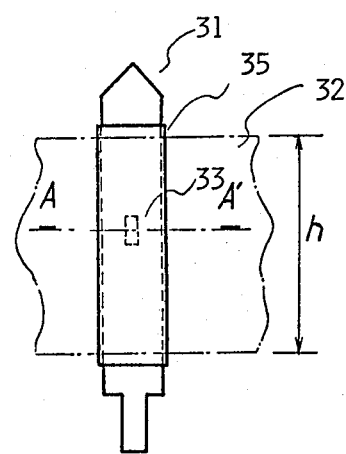
FIG.5 (A)   FIG.5 (B)
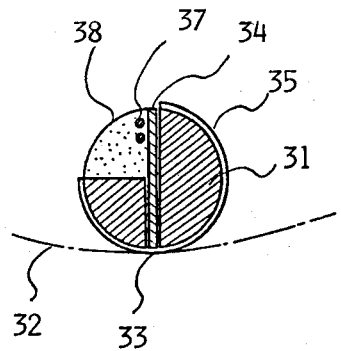
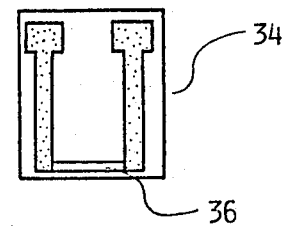
FIG.6   FIG.7

MAGNETIC REPRODUCING APPARATUS WITH MAGNETORESISTIVE HEAD

This application is a continuation of application Ser. No. 116,890, filed on Jan. 30, 1980, now abandoned.

BACKGROUND OF THE INVENTION

The present invention relates to a magnetic reproducing apparatus and, more particular, to an improved magnetic reproduction assembly useful for a magnetic reproducing apparatus with a magnetoresistive head.

The operating principle of magnetoresistive heads was disclosed in, for example, R. P. Hunt U.S. Pat. No. 3,493,694 issued Feb. 3, 1970, entitled "MAGNETORESISTIVE HEAD".

Since the magnetoresistive heads can provide output signals about ten times as high as the well-known electromagnetic effect heads, it is advisable that such magnetoresistive heads be applied to magnetic reproducing apparatus to improve the operation thereof.

OBJECTS AND SUMMARY OF THE INVENTION

Accordingly, it is a primary object of the present invention to provide an improved magnetic reproducing apparatus including a magnetoresistive head.

It is a further object of the present invention to provide an improved magnetic reproduction assembly useful for a magnetic reproducing apparatus with a magnetoresistive head disposed in contact with the back surface of a magnetic storage medium.

It is a further object of the present invention to provide an improved magnetic reproducing apparatus for providing necessary output signals for reproduction purposes, independently of travel speed of a magnetic storage medium such as magnetic tape.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a magnetic record-reproduction device is provided for controlling a program selection system of a tape containing a recording memeber and a base element. The recording member records cue signals indicating positions of the tape to reproducing. The base element supports the recording member. A magnetoresistive head comes into contact with the base element for detecting and reproducing the cue signals recorded in the recording member.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 5(A) and 5(B) are a side view and a front view of another example of the tension arm related to FIGS. 3(A) through 3(C);

FIG. 6 is a section taken in the plane indicated by line A—A' in FIG. 5(B); and

FIG. 7 is a configuration of another example of the magnetoresistive head incorporated within the tension arm shown in FIGS. 5(A) and 5(B), the magnetoresistive head being related to that shown in FIG. 2.

DESCRIPTION OF THE INVENTION

Figure 1:
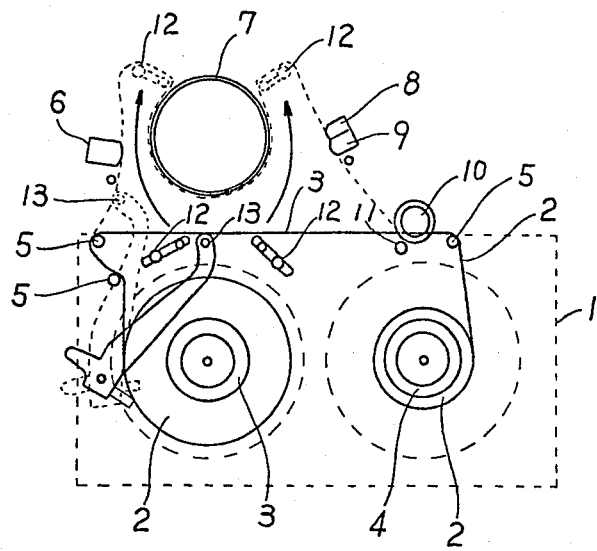
FIG. 1 is a schematic representation of a configuration of a magnetic reproducing apparatus according to the present invention.

FIG. 1 shows a cassette type video tape recorder (VTR) of the type which performs a well-known helical scan. The VTR mainly comprises a cassette 1, a magnetic tape 2, a full-width erase head 6, a rotary head drum 7, an audio erase head 8, an audio control head 9, a loading arm 12, and a tension arm 13. A magnetoresistive head 20, (see FIG. 2) within arm 13 and includes a substrate 21, a film element 22, a pair of conducting strips 23, and leads 24.

In particular, an appropriate amount of the magnetic tape 2 is wound around a supply reel 3 which is associated with a wind-up reel 4. Either the supply reel 3 or the wind-up reel 4 is selectively engaged with a drive source. Along the travel path of the magnetic tape 2, there are provided a guide pin 5, the full-width erase head 6, the rotary head drum 7, the audio erase head 8, the audio control head 9, a pinch roller 10, and a capstan roller 11.

Around the circumference of the rotary head drum 7, there are positioned two or four video heads. While they rotate at about 200 to 300 rps in the direction opposed to that of the travel of the magnetic tape 2, namely, in the direction in which the relative velocity between the magnetic tape 2 and the video heads increases, they contact or move away from the magnetic tape 2. During one rotation of the video heads, they scan the magnetic tape 2 by a field. The well-known helical scan mode is carried out wherein the magnetic tape 2 is in contact with a part of the circumference of the rotary head drum 7 with a certain angle with respect thereto.

The solid line in FIG. 1 indicates the path of the magnetic tape 2 separated from the rotary head drum 7 during a forward operation and a rewind operation. In such a case, the magnetic tape 2 extends between the pair of guide pins 5 each of which is disposed adjacent to the supply reel 3 and to the wind-up reel 4. It is unnecessary that the magnetic tape 2 be in contact with the rotary head drum 7.

The dotted line in FIG. 1 shows the path of the magnetic tape 2 when in contact with the rotary head drum 7 to cause reproduction of pictures. In such a case, the magnetic tape 2 is contrained by the full-width erase head 6, the rotary head drum 7, the audio erase head 8, and the audio control head 9. A pair of loading arms 12 is provided as a tape guide for changing the pathway for the magnetic tape 2 to the position where it comes into contact with the rotary head drum 7. The position of the pair of loading arms 12 is changed from the first position where the magnetic tape 2 is spaced from the rotary head drum 7 to the second position where the former is in contact with the latter as indicated by each of lines with an arrow head in FIG. 1.

The tension arm 13 positioned near the supply reel 3 is pivoted so that the tension arm 13 comes into contact with the back surface of the magnetic tape 2 which is in contact with the rotary head drum 7. The tension arm 13 stresses the magnetic tape 2 appropriately toward the drum 7. The wind-up reel 4 is engaged with the drive source for drive purposes, so that the magnetic tape 2 subsequently travels from the supply reel 3 to the wind-up reel 4. The rotary head drum 7 is operated to cause the reproduction of pictures recorded on the magnetic tape 2.

In addition to the reproduction of the pictures, the rotary head drum 7 functions to record video signals by the video heads provided therein. The full-width erase head 6 functions to completely erase the total signals recorded on the magnetic tape 2 and to record cue signals in video tracks of the magnetic storage medium of the magnetic tape 2. The audio erase head 8 acts to erase only sound signals recorded in audio tracks of the magnetic tape 2.

The audio tracks are formed at the edge of the magnetic tape 2 along the travel direction of the magnetic tape 2. The audio control head 9 is provided for recording sound signals in audio tracks and recording control signals in control tracks of the magnetic tape 2. The control signals are recorded to obtain synchronization between video signals recorded in video tracks of the magnetic tape 2 and the sound signals recorded in the audio tracks of the same. The pinch roller 10 and the capstan roller 11 embrace in combination the magnetic tape 2 so that the magnetic tape 2 rotates round the rotary head drum 7 in a predetermined constant speed. Jitter of the pictures reproduced on a screen greatly depends upon the stability of travel speed of the magnetic tape 2. To secure stable travel speed of the magnetic tape 2, the pinch roller 10 and the capstan roller 11 are provided for embracing the magnetic tape 2 in pressure and, in addition, the tension arm 13 is employed to stress the magnetic tape 2 constantly toward the rotary head drum 7.

At the top of the tension arm 13, there is coupled a magnetoresistive head 20 comprising a film element, preferably, formed of a thin, narrow strip of ferromagnetic metallic material of low anisotropy, such as Permalloy. The magnetoresistive head is provided for detecting cue signals recorded in the magnetic tape 2. The cue signals are recorded to indicate positions of programs recorded in the magnetic tape 2, while the magnetic tape 2 travels. The recording of the cue signals permits the use of well-known program selection systems. The cue signals are detected during the rewind operations and the forward operations of the magnetic tape 2. As the magnetoresistive head is disposed on the top of the tension arm 13, the magnetoresistive head comes in contact with the back surface of the magnetic tape 2. The back surface of the magnetic tape 2 is opposite to the front surface which is in contact with the rotary head drum 7.

According to the provision of the magnetoresistive head disposed on the top of the tension arm 13, the change of travel of the magnetic tape 2 is not prevented by the magnetoresistive head. This means that the space for required magnetic heads can be as compact as possible. On the front surface of the magnetic tape 2, there is formed a layer of a magnetic material, such as a magnetic storage medium. Therefore, on the back surface of the magnetic tape 2, there is formed a base layer for supporting the magnetic layer.

When it is directed during the rewind operations or the forward operations of the magnetic tape 2 that the cue signals should be detected, the top of the tension arm 13 is controlled by a drive means so that it comes in contact with the back surface of the magnetic tape 2 extended between the pair of the guide pins 5, each of which is adjacent to the supply reel 3 and to the wind-up reel 4. The magnetoresistive head is supplied with an appropriate amount of current for driving purposes in order to detect and reproduce the cue signals. The top of the tension arm 13 may be disposed to be continuously in contact with the back surface of the magnetic tape 2 during its rewind operations or its forward operations. The cue signals are erased by the full-width erase head 6.

The principle of the present invention will be now explained as follows: If the reproduction of a data record on the magnetic tape 2 were obtained using the back surface of a tape which includes no magnetic storage medium, spacing loss would be inevitably increased at least by the thickness of the base layer for supporting the magnetic storage medium disposed as the front surface of the magnetic tape 2. This means that reproduction output signals are decreased; The spacing loss is well-known as $-54.6\, d/\lambda$ (dB) (d: the spacing, $\lambda$: recorded frequency). This equation indicates that the spacing loss is minimized as the record frequency becomes longer; It may be possible that an adequately long recorded frequency can be reproduced from the back surface of the magnetic tape 2; The minimum record frequency which can be obtained from the back surface of the magnetic tape 2 depends on the strength of the magnetic field for recording, the thickness of the magnetic storage medium, the thickness of the base layer, the gap between the magnetic heads, the reproduction efficiency, and the like.

In addition, in the conventional head utilizing an electromagnetic effect, the minimum recorded frequency which can be reproduced from the back surface relies upon the relative velocity between the magnetic heads and the magnetic storage medium; Thus it was impossible in practice to obtain the record signals from the back surface because it was required in the conventional head that the minimum recorded frequency be a somewhat large amount. When the magnetic tape 2 and the magnetic heads were driven at a fast speed, the contents of the information to be recorded was decreased, and the drive system was increased in power; On the contrary, in connection with the magnetoresistive head of the present invention, the minimum recorded frequency available is independent of the relative velocity between the magnetic heads and the magnetic storage medium; The magnetoresistive head is superior by about ten times to the conventional head in obtaining recorded signals; And the magnetoresistive head can be formed according to steps wherein a magnetic film, a conductive film, and an insulating film are formed on a substrate by vacuum evaporation methods or plating methods and then are patterned by chemical etching techniques. The size of the magnetoresistive head can be considerably compact as compared with the conventional head.

Figure 2:
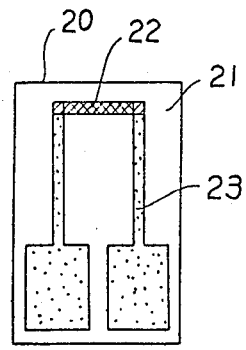
FIG. 2 is a configuration of a magnetoresistive head incorporated within the magnetic reproducing apparatus shown in FIG. 1.
Figure 3:
FIGS. 3(A), 3(B), and 3(C) are a plan view, a side view, and a front view of a tension arm incorporated within the magnetic reproducing apparatus indicated in FIG. 1, respectively.
Figures 3B, 3C:
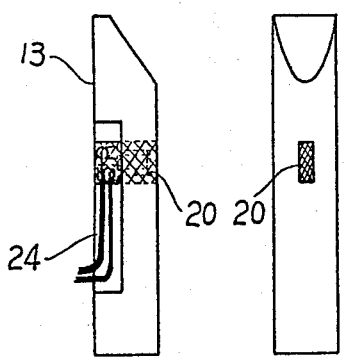

According to the above-mentioned pinciple, the magnetoresistive head is incorporated within the tension arm 13. FIG. 2 shows an example of a preferred embodiment of the magnetoresistive head 20. FIGS. 3(A), 3(B), and 3(C) are respectively a plan view, a side view, and a front view of the top of the tension arm 13 containing the magnetoresistive head 20 shown in FIG. 2.

With reference to FIG. 2, the magnetoresistive head 20 comprises a substrate 21, a magnetic film 22, and a pair of conductors 23. The substrate 21 is made of glass and the like. The magnetic film 22 is preferably formed of a thin-narrow strip of ferromagnetic metallic material of low anisotropy such as Permalloy, having a width of the order about 1 mm, and a thickness of the order of about 300 angstroms.

The magnetoresistive head 20 detects the magnetic fields associated with the magnetization within the magnetic storage medium. The magnetic film 22 is of low anisotropy electrically-conductive magnetic material secured in magnetically bridging relation adjacent the magnetic storage medium. The magnetic film 22 has a selected magnetization state responsive to the magnetic fields within the magnetic storage medium, which rotates the magnetization in the magnetic film 22 and varies accordingly the resistivity thereof. The magnetic film 22 is formed on the substrate 21 according to vacuum evaporation techniques or plating methods. The pair of the conductors 23 are also formed on the substrate 21 such that they are connected to each of the ends of the magnetic film 22 for detecting an electromotive force caused in the magnetic film 22.

In FIGS. 3(A) to 3(C), the top of the tension arm 13 is composed of a nonmagnetic material in a rod shape having a diameter of about 5 mm. The magnetoresistive head 20 is buried within the tension arm 13 such that the magnetoresistive head 20 is spaced from a contact surface of the magnetic tape 2 on the order of about 80 $\mu$m. A pair of parallel dotted lines shown in FIG. 3(A) indicate the provision of the magnetoresistive head 20. As viewed from FIG. 3(B), there are provided a pair of lead lines 24 connected to each of the pair of the conductors 23. A dotted line, perpendicular to the pair of the parallel dotted lines shown in FIG. 3(A), shows the arrangement of the pair of the lead line 24. The pair of lead lines 24 is coupled to a detection circuit at the exterior of the tension arm 13. A latticed symbol shown in FIG. 3(B) indicates a buried portion of the magnetoresistive head 20 within the tension arm 13.

Figure 4:
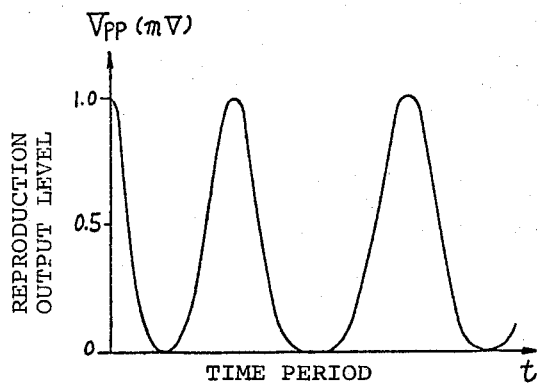
FIG. 4 is a graph representing reproduction output levels of the magnetic reproducing apparatus shown in FIG. 1 v. time in connection with cue signals.

FIG. 4 is a graph showing reproduction characteristics of the cue signals obtained by the magnetoresistive head shown in FIG. 2. The cue signals are recorded within the video tracks by the full-width erase head 6. The cue signals are characterized in that the recorded frequency is about 1 mm and the width of recorded tracks is about 10 mm. The cue signals are reproduced by the magnetoresistive head during the rewind or the forward operations of the magnetic tape 2. The width of the magnetic film 22 of the magnetoresistive head 20 available in detecting the cue signals is on the order of about 1 mm.

The data in FIG. 4 are plotted with reproduction output levels Vpp (mv) as the ordinate, the time period being the abscissa. Provided that the base layer of the magnetic tape 2 is about 16 $\mu$m in thickness, the spacing between the magnetoresistive head 22 and the magnetic storage medium of the magnetic tape 2 is about 0.1 mm. The data of FIG. 4 are obtained under the condition where an appropriate amount of detection current in the order of about 5 mA is applied to the magnetoresistive head and, in addition, no bias current is applied thereto.

As viewed from FIG. 4, the reproduction output levels Vpp obtained are on the order of about 1 mV. The S/N ratio is good enough.

In another example of a preferred form of the present invention, the magnetoresistive head 20 may be formed on any of the guide pins 5 or any other elements adjacent the magnetic tape 2 except for the tension arm 13.

The range of the recorded frequency of the cue signals which can be detected by the magnetoresistive head according to the principle of the present invention is in the order of about 200 or 300 $\mu$m to about 2.0 mm under the condition that the width of the magnetic film 22 of the magnetoresistive head 20 available in detecting the cue signals is in the order of about 100 $\mu$m and that the spacing between the magnetic storage medium of the magnetic tape 2 and the magnetic film 22 of magnetoresistive head 20 is in the order of about 100 $\mu$m. If the spacing is smaller, the recorded frequency of the cue signals to be detected by the magnetoresistive head is decreased to several microns.

In the above-mentioned preferred embodiment of the present invention, the cue signals are recorded in the video tracks in the magnetic storage medium of the magnetic tape 2 by the full-width erase head 6 as disclosed in Japanese published unexamined patent application No. 81211/1978 laid open on July 18, 1978. Instead, the cue signals can be recorded in the control tracks in the magnetic storage medium of the magnetic tape 2 by the audio control head 9 as disclosed in Japanese published examined patent application No. 14205/1978 published on May 16, 1978. In short, as far as the cure signals are recorded in any of the tracks in the magnetic tape 2 having a width on the order of about 10 $\mu$m, the cue signals can be reproduced by the magnetoresistive head of the present invention regardless of the position of the tracks within the magnetic tape 2. The magnetoresistive head can be adopted in its stripe length and its installed position to permit the cue signals to be detected.

FIGS. 5(A) and 5(B) show respectively a side view and a front view of another preferred form of the tension arm containing the magnetoresistive head according to the present invention relates to FIGS. 3(B) and 3(C). In FIGS. 5(A) and 5(B), there are provided a tension arm 31, a magnetic tape 32, a opening 33, an non-magnetic metallic film 35, a pair of leads 37, and a resin material 38.

The diameter of the tension arm 31 is in the order of about 5 to 7 mm. The magnetic tape 32 travels along a path indicated by a numeral h in FIG. 5(B). The opening 33 is formed to bury the magnetoresistive head. The magnetoresistive head is positioned to confront the tracks in the magnetic tape 32 in which the cue signals are recorded. The tension arm 31 is composed of Zn, Al, or any metallic material which is made as a die casting. To secure abrasion-resistance of the tension arm 31 against the magnetic tape 32, the non-magnetic metallic film 35 is wound around a surface of the tension arm 31. The magnetic tape 32 is in contact with the tension arm 31 on this surface. The non-magnetic metallic film 35 is made of SUS 303, SUS 304, SUS 316, or any other stainless steel material. The non-magnetic metallic film 35 is fixed to the body of the tension arm 31 by means of spot welding. Instead of metallic material of Zn and the like of the tension arm 31, any synthetic resin such as a ABS resion may be adopted for the tension arm 31.

The pair of the leads 37 shown in FIG. 5(A) is related to the pair of the lead lines 24 indicated in FIG. 3(B). The resin material 38 is provided for supporting the pair of the leads 37.

FIG. 6 is a section taken in the plane indicated by line A—A' indicated in FIG. 5(B). An element of a magnetoresistive head 34 is buried within the opening 33 of the tension arm 31.

FIG. 7 shows the magnetoresistive head 34 in detail related to FIG. 2. The magnetoresistive head 34 comprises a magnetic film 36 shown in FIG. 7 similar to the magnetic film 22 indicated in FIG. 2.

The magnetoresistive head 34 is in contact with the base layer of the magnetic tape 32, the base layer including no magnetic storage medium. The spacing between the magnetic film 36 and the magnetic storage medium of the magnetic tape 32 formed on the base layer is calculated as at least the sum of the thickness of the base layer of the magnetic tape 32 and the thickness of the non-magnetic metallic film 35. Preferably, the thickness of the base layer is in the order of about 20 μm and that of the non-magnetic metallic film 35 is in the order of about 50 μm. The spacing is obtained as about 70 μm.

Conventionally, the base layer of the magnetic tape 2 or 32 is composed of a thin film made of polyethylene terephthalate (PET) and the like. The base layer of such the thin film provides less abrasion to the magnetic film of the magnetoresistive head than the magnetic storage medium of the magnetic tape. Since the magnetoresistive head does not come in contact with the magnetic storage medium, the magnetic storage medium is protected from being damaged by the magnetoresistive head. If the magnetic storage medium is damaged, reproduction output signals are removed.

As described above, in accordance with the present invention, the cue signals recorded in the magnetic tape can be detected and reproduced with efficiency. The cue signals are characterized by having relative long recorded frequencies. The following features are obtained according to the present invention:

(1) The cue signals are detected regardless of the travel speed of the magnetic tape.

(2) The operations of the reproducing device for driving the magnetic tape are not prevented by a system for detecting and reproducing the cue signals.

(3) Any additional independent operating mechanism is not required to be added to the reproducing device for driving the magnetic tape.

(4) The magnetic storage medium formed in the magnetic tape is not damaged by the system for sensing the cue signals recorded in the magnetic storage medium.

(5) The magnetic film of the magnetoresistive head is protected from abrasion by means of magnetic tape.

(6) The magnetic film can be readily constructed as a multichannel head element where it senses the cue signals recorded in two or more tracks of the magnetic storage medium of the magnetic tape.

Since the base layer of an extensible magnetic tape is not too thick wherein the cue signals can be sensed, such the extensible magnetic tape can be adopted as a storage medium for the present invention in place of the above-stated magnetic tape.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a magnetic-record reproduction system which selectively reproduces magnetic information signals recorded as a plurality of programs on a magnetic-tape including program selection means for selectively retrieving for reproduction a specific program from said plurality of programs, each program location being defined on said tape by associated magnetic cue signals on said tape, said magnetic tape having a record layer on which said magnetic information and cue signals are recorded and a base layer with a top surface contiguous to said record layer and a bottom surface opposite thereto and tape drive means for transporting the tape through said system the improvement comprising:

magnetoresistive detector means in contact with said bottom surface of said base layer for sensing said magnetic cue signals to said program selection means to enable the selective reproduction of said programs.

2. The system of claim 1, wherein said tape drive means includes at least one guide member and said magnetoresistive film is disposed within said at least one guide member.

3. The system of claim 2, wherein said at least one guide member is a movable tape tensioning device.

* * * * *